United States Patent
Vohra et al.

(10) Patent No.: US 6,776,972 B2
(45) Date of Patent: Aug. 17, 2004

(54) RECOVERY OF COMMON SALT AND MARINE CHEMICALS FROM BRINE

(75) Inventors: Rajinder N. Vohra, Gijubhai Badhetea Marg (IN); Pushpito Kumar Ghosh, Gijubhai Badhetea Marg (IN); Vadakke Puthoor Mohandas, Gijubhai Badhetea Marg (IN); Himanshu Labhshanker Joshi, Gijubhai Badhetea Marg (IN); Hasina Hajibhai Deraiya, Gijubhai Badhetea Marg (IN); Rohit Harshadray Dave, Gijubhai Badhetea Marg (IN); Koushik Halder, Gijubhai Badhetea Marg (IN); Ran Bahadur Yadav, Gijubhai Badhetea Marg (IN); Sohan Lal Daga, Gijubhai Badhetea Marg (IN); Kishorkumar Manmohandas Majeethia, Gijubhai Badhetea Marg (IN); Upendra Padmakant Saraiya, Gijubhai Badhetea Marg (IN)

(73) Assignee: Council of Scientific and Industrial Research, New Delhi (IN)

( * ) Notice: Subject to any disclaimer, the term of this patent is extended or adjusted under 35 U.S.C. 154(b) by 237 days.

(21) Appl. No.: 10/003,213

(22) Filed: Oct. 29, 2001

(65) Prior Publication Data

US 2003/0080066 A1 May 1, 2003

(51) Int. Cl.$^7$ ............................. C01D 3/00; C01F 5/00

(52) U.S. Cl. ....................... 423/166; 423/197; 423/155; 423/178; 23/295 S

(58) Field of Search ............................... 423/166, 197, 423/155, 178; 23/303, 302 R, 295 S, 304

(56) References Cited

U.S. PATENT DOCUMENTS 4,026,676 A * 5/1977 Fiedelman
4,224,035 A * 9/1980 Geesen

* cited by examiner

*Primary Examiner*—Steven Bos
(74) *Attorney, Agent, or Firm*—Drinker Biddle & Reath LLP

(57) ABSTRACT

A new process for recovery of common salt, potassium chloride, concentrated magnesium chloride with enriched bromide, and high purity magnesia from brine in an integrated manner, said process comprises preparation of calcium chloride by reaction of hydrochloric acid generated in the process with limestone, desulfatation of brine with calcium chloride, production of sodium chloride of superior quality in solar pans, solar evaporation of bittern thereby producing carnallite and end bittern, processing carnallite through established processes to produce potassium chloride, recovering end bittern containing highly concentrated magnesium chloride and enriched bromide and calcination of a part of the end bittern after solidification to produce high purity magnesia and hydrochloric acid utilizable in the process.

20 Claims, No Drawings

RECOVERY OF COMMON SALT AND MARINE CHEMICALS FROM BRINE

FIELD OF THE INVENTION

The present invention relates to a process for recovery of common salt and marine chemicals of high purity in integrated manner, which boosts the viability of such recovery. The process is amenable to a wide range of brine compositions but especially attractive for brine compositions that are low in sulphate content and yield impure salt when the conventional process of solar salt production is followed.

BACKGROUND OF THE INVENTION

Certain components of brine have industrial uses. Common salt, apart from being an essential dietary component, is a basic raw material for the manufacture of a wide variety of industrial chemicals viz. sodium carbonate (soda ash), sodium hydroxide (caustic soda), and chlorine. Salt is also used in textile, dairy, dyeing, food, fertilizer, paper and pharmaceutical industries. Marine gypsum is used in cement industries and in the preparation of high strength Plaster of Paris. It can also be used as a source of calcium in the preparation of calcium-based siliceous chemicals. Magnesium compounds find applications in agriculture, refractories, pharmaceuticals, rubber, polymer additives and fire retardant. Potash is an essential plant nutrient and chemical grade KCl is used for making other important potash chemicals.

Reference may be made to "Rain Washing of Common Salt Heaps" by M. P. Bhatt, P. S. Jesulpura and K. Sheshadri, *Salt Research and Industry*, 10(2), (1974), 13, who have reported that sea salt which is harvested and subjected to rain water washing, has 0.21% w/w Ca, 0.60% w/w sulphate and 0.06% Mg. The salt requires upgradation to reduce the level of calcium and sulphate, especially for use in chloralkali industry.

Reference may be also made to "Fractional Crystallisation of Salts from Sub-soil brines" by V. P. Mohandas, S. J. Gohil, and S. D. Gomkale, *International Journal of Salt Lake Research* 6, (1998), 331, who have reported that sub-soil brines of Gujarat, India, typically yield salt contaminated with 0.30–0.40% w/w Ca, 0.80–1.00% w/w sulfate and 0.20–0.30% Mg after harvesting and washing of heaps with a minimum quantity of water. This makes the salt unacceptable for industrial application.

The authors have attributed the higher Ca impurity in salt produced from sub-soil brine to the inherent composition of the brine.

In the article "Washing of Strip Mined Rock and Solar Salt at Leslie Salt Corporation, U.S.A. (Symposium on Salt-1, Vol. 1, The Northern Ohio, Geological Society Incorporation, Cleveland, (1961), 449–464), Woodhill has stated that a washery is useful for reducing calcium, magnesium and sulphate impurities in solar salt. The main disadvantage of the method is that there are 10–15% losses, high capital investment is involved, and the maximum level of reduction of Ca is 70%.

In the article "Manufacture of Salt by Series Feeding System" by R. B. Bhatt, R. M. Bhatt, U. V. Chitnis, P. S. Jesulpura and K. Sheshadri, *Salt Research and Industry*, 11, (1979), 9, it has been stated that sea salt can be prepared with lower calcium impurity by adopting series feeding method wherein the brine is subjected to fractional crystallization over narrower density ranges, and the salt is harvested between 27.0–29.5° Be. The drawbacks of this process are that the yield of pure salt is reduced as it is harvested over a narrower density range, and the salt is more contaminated with magnesium sulphate impurity which can only be satisfactorily removed with the help of a washery. Moreover, as found by the present inventors, series feeding does not yield improved quality salt when sub-soil brine is used.

In their patent application (Indian Patent Application No. 315/DEL/95) entitled "A Process for the Preparation of Sodium Chloride containing Low Calcium Impurity from Sea Brine in Solar Salt Works", M. H. Vyas, H. N. Shah, J. R. Sanghavi, M. R. Gandhi and R. J. Sanghavi have claimed that calcium can be reduced by up to 70% in the harvested salt through treatment with activated starch solution. The drawbacks of the process are that it is not applicable to subsoil brines, and it is also difficult to implement the process in large-scale commercial production because of the large requirement of starch solution. Another drawback is that magnesium and sulphate impurities are still high.

In their patent application (PCT Application filed, 2001) entitled "An improved Process for the Removal of Ca Ions from the brine by Marine Cyanobacteria", S. Mishra, P. K. Ghosh, M. R. Gandhi, A. M. Bhatt and S. A. Chauhan have claimed the production of low Ca salt from sea/sub-soil brine by mopping up Ca in the brine through certain types of marine cyanobacteria. The drawback of the process is that it is not readily amenable to scale up and magnesium and sulphate impurities would continue to pose a problem.

Besides the drawbacks indicated for the above processes, none of them integrate with subsequent marine chemicals recovery and do not in any way improve the composition of bittern and, therefore, the process of such recovery is tedious as described below.

Potassium chloride is produced most commonly from potash deposits (e.g., Strassford deposits of Germany) either by froth flotation technique or by a hot leaching process. Reference may be also made to the process described in *World Survey of Potash Resources*, The British Sulfur Corporation, London 1985, wherein potash is produced from Dead Sea brine through intermediate formation of carnallite ($KCl.MgCl_2.6H_2O$). However, sea water and sub-soil brines such as exist in India yield kainite ($KCl.MgSO_4.3H_2O$) double salt instead of carnallite because of the much higher sulphate content of the brine.

Reference may be also made to the paper "Potassium from Sea Water—A Daring Venture", Chemistry & Industry, Nov. 13, 1971, 1309 by J. Kielland wherein it is stated that Dipycrylamine can be used to precipitate potash directly from sea water. The drawback of the process is the extremely high toxicity of the extracting reagent and the difficulty in recycling the extractant.

Reference may be made to "Manufacture of Potassium chloride and byproducts from Sea Bittern" by K. Sheshadri et al. published in *Salt Research and Industry* 7, (April–July 1970), 39–44, wherein bittern is further concentrated in solar pans and, after removing crude salt and Sels' mixture (mixture of NaCl and $MgSO_4$), mixed salt (NaCl and kainite) is formed in solar pans. Mixed salt is dispersed with high density bittern in proper proportion and heated to a temperature of 110° C. when keiserite ($MgSO_4.H_2O$) is formed which is separated by filtering the slurry under hot conditions. The filtrate is cooled to ambient temperature, when camallite crystallizes out. Camallite is decomposed with water to get a solid mixture of sodium chloride and potassium chloride while magnesium chloride goes into solution. Solid mixture of potassium chloride and sodium chloride is purified using known techniques to produce pure potassium chloride. The drawbacks of this process are: Mixed Salt (containing Kainite) is obtained only after two earlier solid evaporates, i.e., crude salt and Sels mixture are removed separately. This is done by solar evaporation in pans, removal of salts from pans, and pumping of liquid into intermediate pans—all of which are highly labor and energy intensive. In order to produce these salts the bittern has to be concentrated to densities as high as 37.5° Be' (Sp. Gr. 1.348) which requires longer evaporating period and/or larger area. Secondly, kainite type mixed salt is to be processed further by mixing the same with high-density bittern and using hot extraction technique followed by cooling to extract carnallite from mixed salt. This is a tedious operation and involves high-energy consumption accompanied by loss of potash in various effluent streams. Thirdly, there is considerable loss of valuable magnesium in all the solid evaporates and there is no provision in this process to recover other products like high purity magnesia.

Reference may be also made to the articles by M. K. Raval & K. V. Satyanarayana in "Bromine Content in Bittern From Salt Works in Kuda—Kutch Region", *Salt Research and Industry*, Vol. 4, No. 2, (April 1967), 56–58 and by M. H. Jadhav and V. V. Chowgule in "Bromine concentration with rise in Density of Sea Bittern", *Fifth International Symposium on Salt*, from which it can be concluded that although there is increase in bromide concentration in bittern with evaporation, a significant part of the original bromide content in bittern tends to be lost in the solid evaporates in the course of recovery of potash via kainite salt as described above. This constrains bromine to be recovered at 29–32° Be', as a result of which its recovery is less efficient, since bromide concentration in bittern is in the range of 2–4 $gL^{-1}$.

Reference may be made to "Improved Treatment of Waste Brines" by Chr. Balarew, D. Rabadjieva and S. Tepavitcharova, (*International Symposium on Salt* (2000), 551–554) for recovery of marine chemicals. The principle drawbacks of this process, which advocates crystallization of salt followed by removal of magnesium in bittern with lime, subsequent recovery of potash and recirculation of calcium chloride into bittern for the purpose of desulphatation, are that salt quality is not improved in any way, and the recovery of potash would involve removal of large quantities of water which is not feasible with solar evaporation.

Reference may be made to "Potassium chloride from sea bittern—Part 2, Recovery of potassium chloride, magnesium sulphate and potassium sulphate" by Gadre G. T., Rao A. V. and Bhavnagary H. M., *Jr. Sc. Ind. Res.*, 17(A), 9, (1958), 376, wherein bittern is cooled to 10°–5° C. to crystallize sulphate ion as Epsom salt. The bittern, after removal of sulfate, is concentrated to crystallize carnallite. The main drawback of this process is that apart from high cost of refrigeration and bulk handling, the process removes sulphate to a maximum extent of 50% of sulphate originally present in bittern, which at a later stage will contaminate carnallite, rendering the product impure.

According to the present invention, desulphatation of low density brine, i.e., brine prior to crystallization of salt, with in situ generated calcium chloride or with calcium chloride in distiller waste is found to be a highly effective solution to all of the drawbacks described in the prior art. It has been found in the course of the invention that, although calcium impurity in salt is among the principal concerns which dictates its price and usability in chloralkali industry, the addition of calcium chloride to brine for the purpose of desulphatation does not increase calcium impurity of salt but actually decreases it. Without wishing to be bound by any theory, it is believed that addition of calcium chloride forcibly eliminates calcium sulphate as a precipitate because of the large calcium ion concentration in brine and the sparing solubility of calcium sulfate. As a result, less calcium sulphate coprecipitates with common salt during the crystallization of the latter at 25° Be' and beyond. The residual calcium in the brine which adheres to the salt crystals is easily washable as it is primarily in the form of calcium chloride, which has much higher solubility than calcium sulphate. Removal of sulfate also reduces build up of magnesium sulphate impurity in salt, and the adhering magnesium chloride impurity is easily washable. Most remarkably, sub-soil brine, which yields salt of the lowest purity, is especially attractive since the requirement of desulphating chemical is the least and the salt quality can be upgraded to purity even superior to that obtained presently for sea salt. As further established in the course of the invention, addition of calcium chloride to effect desulphatation does not in any way deteriorate the characteristics of the bittern, and camallite can be recovered with ease. Further, as found in the course of the present invention, desulphatation also allows steady build-up of bromide concentration in bittern with negligible loss in solid evaporates. Furthermore, desulfatation allows high purity magnesium chloride to be formed, a part of which can be converted into magnesium oxide of high purity with concomitant production of hydrochloric acid, which can be utilized for production of calcium chloride. Another novelty of the present invention is the use of soda ash distiller waste for desulphatation. Such waste is rich in calcium chloride and sodium chloride, both of which are useful in the methodology of the invention.

SUMMARY OF INVENTION

The present invention provides an improved and integrated process for recovery of salt and marine chemicals, which is centered around desulphatation of brine and obviates the drawbacks as detailed above.

The present invention also provides a method for preparing high purity salt, particularly from sub-soil brine, through simple washing of the crystallized salt with water, and at virtually no extra cost, through the process of integration, and further to prepare salt of very high purity through only additional incremental cost.

The present invention also provides a method for integrating salt manufacture with soda ash production, and for using calcium rich distiller waste generated in soda ash plants for the desulphatation process.

The invention also provides a method for recovering salt and marine chemicals from high density, low sulphate sub-soil brine so as to maximize salt productivity, minimize requirement of desulphating chemicals, and achieve the highest differential improvement in salt quality.

The present invention also provides a seeding process for easy granulation of calcium sulphate leading to the easy separation from brine.

The present invention also provides a method for using the carbon dioxide gas produced when lime stone is dissolved in hydrochloric acid, to produce magnesium carbonate and potassium carbonate in the down stream processes, through well established processes.

The present invention also provides a method for determining that there is negligible loss of bromine when desulfated bittern is processed by further evaporation to produce carnallite, with the result that bromide can be enriched in the end bittern and can then be processed by the well established methods of bromine recovery which prefer higher concentration of bromide ions for better economy.

DETAILED DESCRIPTION OF THE INVENTION

The present invention relates to recovery of industrial grade salt and marine chemicals from brine in an integrated manner. The process involves treatment of salt brine with calcium chloride to precipitate calcium sulphate, solar evaporation of desulfated brine in crystallizers to produce salt, solar evaporation of bittern to produce carnallite, decomposition of carnallite to recover sodium chloride and potassium chloride mixture and processing of this solid mixture to produce potassium chloride by known hot extraction technique. End bittern obtained after crystallisation of carnallite is calcined to produce high purity magnesia and hydrochloric acid. Limestone is treated with hydrochloric acid to produce calcium chloride, which is recycled for desulphatation of brine while the carbon dioxide can be recycled for preparation of carbonates of magnesium and potassium by well established routes.

Accordingly, the present invention provides a process for recovery of common salt and marine chemicals from brine 3–24°Be' in integrated manner comprising the steps of:

(i) reacting of 1–12 M hydrochloric acid which is obtained from calcination of magnesium chloride of end bittern at 600–800° C. with calcerous material including limestone in stoichiometric ratio of one part of limestone with two parts of hydrochloric acid to prepare calcium chloride of 100–600 g/L concentration required for desulphatation;
(ii) treating said brine with calcium chloride as obtained in step (i) to produce granular calcium sulphate through a seeding process;
(iii) separating calcium sulphate from brine;
(iv) evaporating desulphated brine in solar pans up to 29–32° Be' thereby crystallising out salt;
(v) washing salt with water or dilute brine to remove adhering chlorides of calcium and magnesium;
(vi) evaporating bittern in solar pans from density range of 29° Be' to 35.5° Be'to crystallise crude carnallite and thereafter recovering potassium chloride by known techniques;
(vii) recovering concentrated end bittern comprising magnesium chloride and enriched bromide; and
(viii) solidifying a part of the end bittern and calcining in the temperature range of 600–800° C. to produce solid magnesium oxide and hydrochloric acid sufficient for recycling in step (i).

In an embodiment of the present invention, calcium chloride, as in distiller waste of soda ash in the concentration of 5–15% $CaCl_2$ in 0.8–1.2 mole of calcium to sulphate, can also be used.

In another embodiment of the present invention, treating the desulphated brine as obtained in step (ii) above with barium chloride in 0.80–0.95 mole ratio of barium to residual sulphate ion can be used to ensure near-complete desulphatation.

In still another embodiment of the present invention, marine chemicals such as common salt, potassium chloride, magnesium chloride enriched with bromide, high purity magnesia and calcium sulfate with <0.5% chloride, can be produced in an efficient and integrated manner from sub-soil/sea brine of 3–24° Be' density and sulphate concentration typically in the range of 5–18 g/L measured at 16° Be'.

In yet another embodiment of the present invention, recovery of said marine products can be most efficiently undertaken through reduction of sulphate concentration of brine to a concentration in the range of 0.5–2.0 g/L.

In still another embodiment of the present invention, the reduction of sulphate is achieved by adding calcium chloride produced in situ.

In yet another embodiment of the present invention, removal of calcium sulphate from desulfated brine is facilitated through a seeding technique which allows easy granulation of the resultant calcium sulphate formed.

In still another embodiment of the present invention, sub-soil brine having high sodium chloride concentration (up to 18° Be') and low sulphate concentration (<6 g/L at 16° Be') is especially suitable as brine source.

In yet another embodiment of the present invention, brines located in the vicinity of soda ash plants can be treated with the distiller waste containing 5–15% calcium chloride.

In still another embodiment of the present invention, the primary process of desulfatation, salt recovery and carnallite production can be carried out readily in the field in large solar pans.

In yet another embodiment of the present invention, desulfatation allows build up of bromide concentration in bittern up to 7.5 g/L at 35.5° Be' without any significant loss of bromide along with crystallized solids during evaporation.

Calcium chloride can be prepared by reaction between limestone and recycled hydrochloric acid in leach tank under ambient condition followed by treatment with a small amount of lime to raise pH to 5.5 and filtration through a bed of calcium sulphate produced in the process itself to eliminate unwanted color from iron impurities. The concentration of calcium chloride solution is preferably maintained between 410 and 440 g$L^{-1}$. Calcium chloride is alternatively obtained as a clear liquid after settling the distiller waste from soda ash, which typically has a composition of 10–12% $CaCl_2$ and 5–7% NaCl.

Brine, preferably with density in the range of 15° Be'–22° Be' (Sp. Gr. 1.11–1.14), is treated with calcium chloride solution to eliminate calcium sulphate as described above. This reaction can be carried out in a reaction vessel or preferably in the field in large solar pans. When undertaken in a reaction vessel, a part of the output slurry of calcium sulphate is fed back to the vessel as seed. This makes the precipitate granular, which settles efficiently at the bottom.

Desulfated brine is allowed to concentrate in the condenser and then charged into the crystallizer at around 25° Be' (Sp. Gr. 1.21) whereupon common salt crystallizes out. Evaporation of brine treated thus in solar pans yields salt of high purity when washed with small quantities of dilute brine or fresh water in the field to remove adhering calcium and magnesium chlorides.

Desulfatation with calcium chloride does not remove sulphate completely from the brine, and small amount of calcium in the form of calcium sulphate coprecipitates with the crystallized salt. If salt of still higher purity is required, more complete desulphatation of brine may be carried out with barium chloride whose usage, however, is minimized because of the first stage of desulphatation with calcium chloride. To avoid any contamination of the salt with barium ion, the barium chloride is used in slightly less than the stoichiometric amount of sulphate present in the brine following treatment with $CaCl_2$, the sulphate concentration typically being in the range of 1–3 g/L at 24° Be'. It is preferable to carry out desulphatation with barium chloride in reaction vessels than in the field.

The mother liquor (bittern) obtained after crystallization of salt having density in the range of 29–30° Be' (Sp. Gr. 1.25–1.26) is fed to shallow impermeable solar pans where it undergoes further solar evaporation. As density rises to 32 to 33° Be' (Sp.Gr. 1.28–1.284), excess sodium chloride present in original bittern crystallizes out, which is removed. On further evaporation, camallite double salt ($KCl.MgCl_2.6H_2O$) crystallizes out at a density of 35 to 35.5° Be' (Sp.Gr. 1.318–1.324) along with residual NaCl as well established in the art.

Carnallite is decomposed with water to remove magnesium chloride and a mixture of potassium chloride and sodium chloride. Purification of the latter to obtain potassium chloride is achieved as well established in the prior art. Residual sodium chloride/potassium chloride is fed back into the carnallite pan for enhanced recovery in the subsequent cycle.

Bittern obtained after removal of carnallite, having a density of up to 35.5° Be' (Sp. Gr. 1.324), is a concentrated solution of magnesium chloride and is known as end bittern with magnesium chloride concentration ranging from 400 to 430 $gL^{-1}$. The end bittern was analyzed for bromide and its concentration found to be 7.5 $gL^{-1}$ (expressed as elemental bromine), i.e., nearly 3 times the bromide concentration at 29° Be' (Sp.Gr. 1.25) and 1.5 times the concentration at 32° Be' (Sp.Gr. 1.28) which is typically the density range at which bromine is recovered in many plants. Since the volume of bittern is reduced by a factor of three in going from 29° Be' to 35.5° Be', there is essentially no loss of bromide during the process of concentration.

End bittern is reacted in calcination system at a temperature ranging from 600 to 800° C. to form magnesium oxide and hydrochloric acid according to the following equation:

$$MgCl_2.6H_2O \rightarrow MgO + 2HCl + 5H_2O$$

The following examples are given by way of illustration and should not be construed to limit the scope of the invention:

EXAMPLE 1

Brine of 24° Be' (Sp. Gr. 1.198) density, with 5.23 $gL^{-1}$ and 0.86 $gL^{-1}$ concentrations of $SO_4^{2-}$ and $Ca^{2+}$, respectively, was desulphated with calcium chloride.

Calcium chloride was prepared by dissolving limestone in concentrated hydrochloric acid followed by addition of lime in order to neutralize residual acid and precipitate out iron impurities. After settling, the decanted solution was filtered over a bed of calcium sulphate to yield a colorless solution with calcium chloride content estimated as 444 $gL^{-1}$. 3.6 L of brine was treated with 0.068 L of the calcium chloride solution prepared above. After removal of calcium sulphate, which after washing contained 0.45% $Cl^{1-}$, desulphated brine was found to contain 1.73 $gL^{-1}$ of $SO_4^{2-}$. A part of desulphated brine was concentrated by solar evaporation till a density of 29° Be' (Sp. Gr. 1.25) was reached and most of the common salt crystallized out. The common salt, on chemical analysis, contained 0.2% $Ca^{2+}$ whereas the salt without desulphatation had 0.35% $Ca^{2+}$. The second part of desulphated brine of 24° Be' was treated with barium chloride in such a manner that 80% of residual sulphate content of brine was precipitated as barium sulphate. The brine was decanted and concentrated by solar evaporation till density of 290 Be' (Sp.Gr. 1.25) was achieved. Calcium content of the crystallised sodium chloride was found to be in the range of 0.03–0.04% after washing the salt with minimum quantity of water. The above example clearly shows that desulphatation of brine first with calcium chloride and then with barium chloride gives very pure quality salt while economizing on the use of barium chloride.

EXAMPLE 2

A field scale experiment was conducted to produce salt form sub soil brine in the salt field itself using calcium chloride prepared as in Example 1 as a desulphating agent. Subsoil brine of density 16.5° Be' (Sp.Gr. 1.128) had the following chemical composition: Mg, 6.3 $gL^{-1}$; Ca 1.17 $gL^{-1}$; $SO_4$ 6.5 $gL^{-1}$; Cl, 117.0 $gL^{-1}$; Na, 64.0 $gL^{-1}$. 50000 L of above brine was treated with 950 L of calcium chloride having a concentration of 440 $gL^{-1}$ $CaCl_2$ in condenser pan. The desulphated brine was concentrated to 25° Be' density and then transferred to crystalliser for salt crystallisation. The common salt crystallised between density range of 25° Be' (Sp. Gr. 1.121) to 30° Be' (Sp. Gr. 1.26) and was harvested, heaped and washed with minimum quantity of water to remove the adhering highly soluble calcium and magnesium impurities. The salt on dry basis was analysed as: Ca, 0.11% w/w; Mg, 0.09% w/w; $SO_4$, 0.06% w/w; NaCl 99.0% w/w. Total quantity of washed common salt obtained in this experiment was approximately 5 tons.

EXAMPLE 3

40 L of 29° Be' desulphated bittern with chemical analysis as follows: $Mg^{2+}$, 46.0 $gL^{-1}$; $Na^+$, 44.1 $gL^{-1}$; $K^+$, 13.9 gL-1; $Ca^{2+}$, 2.0 $gL^{-1}$; $Cl^-$, 193 $gL^{-1}$; $SO_4^2$, 2.4 $gL^{-1}$; $Br^-$, 2.5 $gL^{-1}$ was poured in shallow pans where it was allowed to concentrate using solar energy. Initially, this bittern wast concentrated to a density of 32.2° Be' when excess salt separated out which was removed. On further evaporation with solar energy in a second shallow pan, bittern was further concentrated up to a bittern density of 35.5° Be' (specific gravity 1.32). 5.5 kg of crude camallite separated out with the following probable composition: KCl, 15.00%; $MgCl_2$; 28.22%; $CaSO_4$, 0.46%; $CaCl_2$, 0.36%; NaCl, 6.2%.

1 kg of the carnallite obtained as above was processed initially with 0.4 kg of water under ambient conditions. After separation of solid and liquid phases, solid phase was found to contain 121.4 g of KCl thereby indicating a recovery of 79% of KCl originally present in carnallite, with the rest contained in the liquid phase. Analysis of the liquid phase indicated of 41.2 $gL^{-1}$ KCl, which was almost similar to concentration of KCl in bittern before formation of carnallite. The liquid phase was mixed with that bittern and allowed to concentrate in solar pans for further recovery of carnallite. This greatly reduced loss of KCl. The KCl/NaCl mixture so obtained was processed further using the well known hot extraction technique to produce potassium chloride containing 97.8% KCl.

After removal of camallite, 11 L of end bittern having chemical analysis as given below was obtained: $Mg^{2+}$, 108.7 $gL^{-1}$; $Na^+$, $gL^{-1}$, $K^+$, 1.4 $gL^{-1}$; $Ca^{2+}$, 1.6 $gL^{-1}$; $Cl^-$, 324.5 $gL^{-1}$; $SO_4^{2-}$, 0. $gL^{-1}$; $Br^-$, 7.5 $gL^{-1}$; B, 0.11 $gL^{-1}$. A part of the end bittern was calcined at a temperature of 600–800° C. producing crude magnesium oxide followed by washing with water to yield magnesium oxide containing 98.5% MgO. Hydrochloric acid produced in the process as by-product can be recycled for the process of production of calcium chloride described in Example 1.

EXAMPLE 4

29° Be' bittern obtained after recovery of salt from sub-soil brine was used as raw material for desulphatation in a reaction vessel. In the reaction vessel, bittern and calcium chloride flow rates were kept at 0.21 $Lmin^{-1}$ and 0.013 $Lmin^{-1}$, thereby producing 9.13 g/minute of solid calcium sulphate in the form of a slurry. 0.06 $Lmin^{-1}$ of seed slurry containing 18.26 $gmin^{-1}$ of calcium sulphate was added continously into the reaction vessel. Two third of the output slurry was recycled into the reaction vessel, as seed, while one third was used for further processing to enable a continous process to be achieved. The output calcium sulphate slurry was granular and easily settled to a concentration of 294 $gL^{-1}$ to allow decantation of clear desulphated bittern.

The desulphatation was scaled up and 2400 liters of such desulphated bittern was obtained and concentrated in a solar pan. After removing excess sodium chloride at a density of 32.5° Be' (Sp. Gr. 1.288), bittern was further evaporated untill carnallite deposited at a density of 35.5° Be' (Sp. Gr. 1.324). A total of 340 kg of carnallite crystallized out in the pan. Chemical analysis of carnallite is given below: $CaSO_4$, 0.816%; $MgCl_2$, 35.25%; NaCl, 8.42%; KCl, 15.03%. About 650 liter of end bittern, having following chemical analysis was obtained after removal of carnallite at a density of 35.5° (Sp. Gr. 1.324): $Ca^{2+}$, 2.12 $gL^{-1}$; $SO_4^{2-}$, 0.33 $gL^{-1}$; Na, 1.50 $gL^{-1}$; K, 1.10 $gL^{-1}$; $Cl^-$, 336.8 $gL^{-1}$; Boron as B, 0.1 $gL^{-1}$.

EXAMPLE 5

Brine was treated with settled distiller waste of a soda ash industry. The distiller waste had the following composition: $CaCl_2$, 12.9%(w/v); NaCl, 6.6% (w/v). Similar results as those reported in Example 1 were obtained when the distiller waste was added to maintain the same ratio of calcium to sulphate as in Example 1.

The present invention provides the following advantages. Very low sulphate bittern containing 1–3 g/L sulphate at 29° Be', which is known to yield a simple means of efficient recovery of potassium chloride and magnesium chloride via intermediate carnallite, can be generated from high sulphate brine such as sea water and other forms of brine typically in many regions of the world, through an economic process of desulphatation with the distiller waste from the soda ash industry, and with the further advantage of production of superior quality salt. This is especially applicable where salt production and soda ash production are integrated such as in several large industries.

The process is also most attractive for certain sub soil brines which are low in sulphate concentration (<6 g/L at 16.5° Be'), and which have an inherent advantage of high salt concentration but yield poor quality salt with high (>0.3%) insoluble calcium impurity.

Desulphatation of sea brine and such sub soil brine as described above allows bromide content in the brine to be progressively increased up to 7.5 g/L in 35.50 Be' end bittern, with neglible loss of bromide during the process of concentration.

When integrated with downstream production of magnesia, hydrochloric acid generated as by-product can be utilized in preparation of calcium chloride from inexpensive limestone and other inexpesive calcareous raw materials, while the liberated carbon dioxide can be utilized for production of carbonate salts of potassium and magnesium through well established processes. This is especially advantageous where there is no accessibility of distiller waste.

Forced desulphatation of brine eliminates the need for elaborate condensers normally employed to crystallize out the maximum possible amount of calcium sulphate through natural solar concentration.

Sub-soil brine having high sodium chloride concentration (up to 18° Be') and low sulphate concentration (<6 g/L at 16° Be') is especially suitable as brine source to maximize productivity, minimize use of desulphating chemical, and maximize the advantage of the process in terms of salt quality upgradation.

Brines located in the vicinity of soda ash plants can be treated with the distiller waste containing 5–15% calcium chloride and 1–7% sodium chloride so as to maximize the cost-effectiveness of the process.

What is claimed is:

1. A process for recovery of common salt and marine chemicals from brine in an integrated manner, said process comprising the sequential steps of:
   (i) treating brine with a composition comprising calcium chloride to produce a calcium sulphate precipitate;
   (ii) seperating the precipitated calcium sulphate from the brine to obtain partly desulpahted brine;
   (iii) treating the partly desulpahated brine obtained in step (ii) with barium chloride to obtain substantially desulphatated brine;

(iv) evaporating the substantially desulphated brine thus obtained in step (iii) to a density of 29–32° Be' to obtain crystals of common salt having a negligible amount of sulphate salts, and a bittern;

(v) washing the common salt thus obtained in step (iv) with water or dilute brine to remove adhering chlorides of calcium and magnesium;

(vi) evaporating the bittern obtained in step (iv) up to a density of about 35.5° Be' to obtain crude carnallite and a concentrated end bittern comprising magnesium chloride and enriched bromide;

(vii) solidifying a part of the end bittern and calcining the solidifed part to produce solid magnesium oxide and hydrochloric acid; and (viii) reacting the hydrochloric acid produced in step (vii) with a calcerous material comprising limestone to provide calcium chloride, and recycling the calcium chloride to step (i).

2. The process as claimed in claim 1, wherein the recovered marine chemicals include, potassium chloride, magnesium chloride enriched with bromide, high purity magnesia and calcium sulphate, each containing less than 0.5% chloride.

3. The process as claimed in claim 1, wherein the brine treated in step (i) has a density of 3–24° Be'.

4. The process as claimed in claim 1, wherein the composition comprising calcium chloride in step (i) is calcium chloride or soda ash distiller waste.

5. The process as claimed in claim 4, wherein the soda ash distiller waste contains 5–15% calcium chloride.

6. The process as claimed in claim 4, wherein the calcium chloride is prepared by reacting hydrochloric acid with calcerous material.

7. The process as claimed in claim 1 wherein in step (i), the calcium chloride has a concentration in the range of 100 to 600 g/L.

8. The process as claimed in claim 1 wherein in step (ii), the precipitated calcium sulphate is separated in granular form from the brine by the brine.

9. The process as claimed in claim 1 wherein in step (iii), 0.80–0.95 mole ratio of barium to residual sulphate ion in the form of $BaCl_2$ is used.

10. The process as claimed in claim 1 wherein in step (iv), evaporation of the bittern is carried out in solar pans.

11. The process as claimed in claim 1 wherein in step (vi), the bittern is evaporated to a density of in the range from 29 to 35.5° Be'.

12. The process as claimed in claim 1 wherein in step (vi), the crude carnallite is obtained in the form of crystals.

13. The process as claimed in claim 1 wherein in step (vi), the crude carnallite thus obtained has the composition 15.00% KCl; 28.22% $MgCl_2$; 0.46% $CaSO_4$; 0.36% $CaCl_2$; and 6.2% NaCl.

14. The process as claimed in claim 1 wherein in step (vi), the crude carnallite thus obtained is decomposed to obtain a sodium chloride and potassium chloride mixture.

15. The process as claimed in claim 14 wherein potassium chloride is recovered from the mixture.

16. The process as claimed in claim 1 wherein in step (vii), the solidified end bittern is calcined at 600 to 800° C. to obtain MgO and HCl.

17. The process as claimed in claim 1 wherein in step (i), the sulphate concentration of the brine is in the range of 5 to 18 g/L at 16° Be'.

18. The process as claimed in claim 1 wherein in step (ii), the sulphate concentration of the brine is in the range of 0.5 to 2.0 g/L.

19. The process as claimed in claim 1 wherein the brine treated in step (i) is sub-soil brine having up to 18° Be' of sodium chloride and less than 6 g/L of sulphate at 16° Be'.

20. The process as claimed in claim 1 wherein the bromide concentration in the concentrated end bittern from step (vi) is up to 7.5 g/L at 35.5° Be'.

* * * * *